(12) United States Patent  (10) Patent No.: US 8,712,143 B2
Tran  (45) Date of Patent: Apr. 29, 2014

(54) PROCESSING FINANCIAL DOCUMENTS

(75) Inventor: Sylvan Tran, Corona, CA (US)

(73) Assignee: Bank of America Corporation, Charlotte, NC (US)

( * ) Notice: Subject to any disclaimer, the term of this patent is extended or adjusted under 35 U.S.C. 154(b) by 532 days.

(21) Appl. No.: 12/714,247

(22) Filed: Feb. 26, 2010

(65) Prior Publication Data

US 2011/0211746 A1  Sep. 1, 2011

(51) Int. Cl.
 *G06K 9/00* (2006.01)

(52) U.S. Cl.
 USPC ............ 382/137; 382/135; 382/138; 382/100

(58) Field of Classification Search
 None
 See application file for complete search history.

(56) References Cited

U.S. PATENT DOCUMENTS

| | | | | |
|---|---|---|---|---|
| 5,077,805 | A * | 12/1991 | Tan | 382/137 |
| 6,115,494 | A * | 9/2000 | Sonoda et al. | 382/165 |
| 6,128,401 | A * | 10/2000 | Suzuki et al. | 382/135 |
| 6,188,787 | B1 * | 2/2001 | Ohmae et al. | 382/165 |
| 6,600,823 | B1 | 7/2003 | Hayosh | |
| 7,693,305 | B2 * | 4/2010 | Emerson et al. | 382/112 |
| 7,697,728 | B2 * | 4/2010 | Emerson et al. | 382/112 |
| 7,735,721 | B1 * | 6/2010 | Ma et al. | 235/379 |
| 7,769,772 | B2 * | 8/2010 | Weyl et al. | 707/765 |
| 7,950,698 | B2 * | 5/2011 | Popadic et al. | 283/70 |
| 8,229,203 | B2 * | 7/2012 | Faulkner et al. | 382/137 |
| 2001/0006556 | A1 * | 7/2001 | Graves et al. | 382/135 |
| 2002/0037097 | A1 * | 3/2002 | Hoyos et al. | 382/137 |
| 2004/0131242 | A1 * | 7/2004 | Klevtsov | 382/137 |
| 2005/0094861 | A1 * | 5/2005 | Prakash et al. | 382/137 |
| 2007/0019855 | A1 * | 1/2007 | Marlett et al. | 382/139 |
| 2007/0156438 | A1 * | 7/2007 | Popadic et al. | 705/1 |
| 2008/0232648 | A1 * | 9/2008 | Emerson et al. | 382/112 |
| 2009/0034848 | A1 * | 2/2009 | Sakamoto et al. | 382/195 |
| 2009/0034849 | A1 * | 2/2009 | Grosvenor | 382/199 |
| 2009/0324053 | A1 * | 12/2009 | Ross et al. | 382/137 |
| 2010/0280859 | A1 * | 11/2010 | Frederick, II | 705/7 |
| 2011/0091092 | A1 * | 4/2011 | Nepomniachtchi et al. | 382/139 |

* cited by examiner

*Primary Examiner* — Jason M. Repko
*Assistant Examiner* — Avinash J Yentrapati
(74) *Attorney, Agent, or Firm* — Banner & Witcoff, Ltd.; Michael A. Springs

(57) ABSTRACT

Methods, computer readable media, and apparatuses for processing financial documents are presented. Image data associated with a first financial document, such as a check to be deposited, may be received. A first multivariate vector may be determined based on the received image data, and the first multivariate vector may include a plurality of vector components. Each vector component may represent a distance from an edge of the first financial document to a feature of the first financial document, and each vector component may be a ratio of distances. The determined first multivariate vector may be compared with a second multivariate vector associated with a second financial document. Based on the comparing, a confidence score for the first financial document may be determined. A transaction involving the first financial document may be authorized in response to the confidence score exceeding a threshold.

21 Claims, 8 Drawing Sheets

PROCESSING FINANCIAL DOCUMENTS

BACKGROUND

The rise of computers and the Internet has allowed financial institutions to serve their customers in new and different ways. For example, financial institutions now may enable their customers to view their account balances and statements, pay bills, and otherwise manage their money online In addition, the proliferation of consumer electronic devices featuring network connectivity has given financial institutions more opportunities to provide more convenient services to their customers. For example, using such devices, customers of financial institutions may be able to conduct transactions, transfer funds and make deposits. But as financial institutions provide such services to their customers, financial institutions also may wish to prevent deception or abuse.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to processing financial documents, such as, a check to be deposited with a financial institution. In the case of a check to be deposited, one or more aspects of the disclosure may allow a financial institution to prevent one check from being deposited twice via different deposit channels. According to one or more aspects, image data associated with a first financial document may be received. Subsequently, a first multivariate vector may be determined based on the received image data, and the first multivariate vector may include a plurality of vector components. Each vector component of the plurality of vector components may represent a distance from an edge of the first financial document (e.g., a check to be deposited) to a feature of the first financial document, such as printed or handwritten text or a line or shape appearing on the first financial document. In addition, the first multivariate vector may be referred to as "multivariate," because each vector component may be independent of the other vector components. Furthermore, each vector component of the plurality of vector components may be a ratio of distances. Thereafter, the determined first multivariate vector may be compared with a second multivariate vector associated with a second financial document. Based on the comparison, a confidence score for the first financial document may be determined. The confidence score may represent the degree to which the two documents are dissimilar, as if two documents are similar, one of them may be an improper copy of the other.

In at least one arrangement, a transaction involving the first financial document may be authorized in response to the confidence score exceeding a predetermined threshold. A threshold may be selected from a plurality of thresholds based on a channel through which the image data associated with the first financial document may be received. Channels may include sources through which a transaction is performed or data is received. For instance, image data may be received via a deposit channel associated with automated teller transactions, via a deposit channel associated with human teller transactions, and/or via one or more other channels, and a threshold may be selected accordingly. Thereafter, a transaction involving the first financial document may be authorized in response to the confidence score exceeding the selected threshold. Furthermore, a threshold of the plurality of thresholds associated with a particular channel may be modified based on deception statistics for the particular channel.

In at least one additional arrangement, the received image data may be separated into a plurality of color component images. Based on at least one of the plurality of color component images, a third multivariate vector may be determined. The third multivariate vector may include a third plurality of vector components, and each vector component may represent a distance from an edge of the first financial document to a feature of the first financial document.

In at least one additional arrangement, a first routing transit number, a first account number, and a first identification number associated with the first financial document may be determined based on the received image data. Then, the first routing transit number, the first account number, and the first identification number associated with the first financial document may be compared with a second routing transit number, a second account number, and a second identification number associated with a second financial document. Based on this comparison, an additional confidence score for the first financial document may be determined.

In at least one additional arrangement, the plurality of vector components included in the first multivariate vector may include a first vector component representing a first distance from a first edge of the first financial document to a first feature of the first financial document and a second vector component representing a second distance from a second edge of the first financial document to a second feature of the first financial document, the second edge being different from the first edge. For instance, a multivariate vector may include a first vector component that originates at a top edge of a financial document and a second vector component that originates at a left edge of the financial document.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
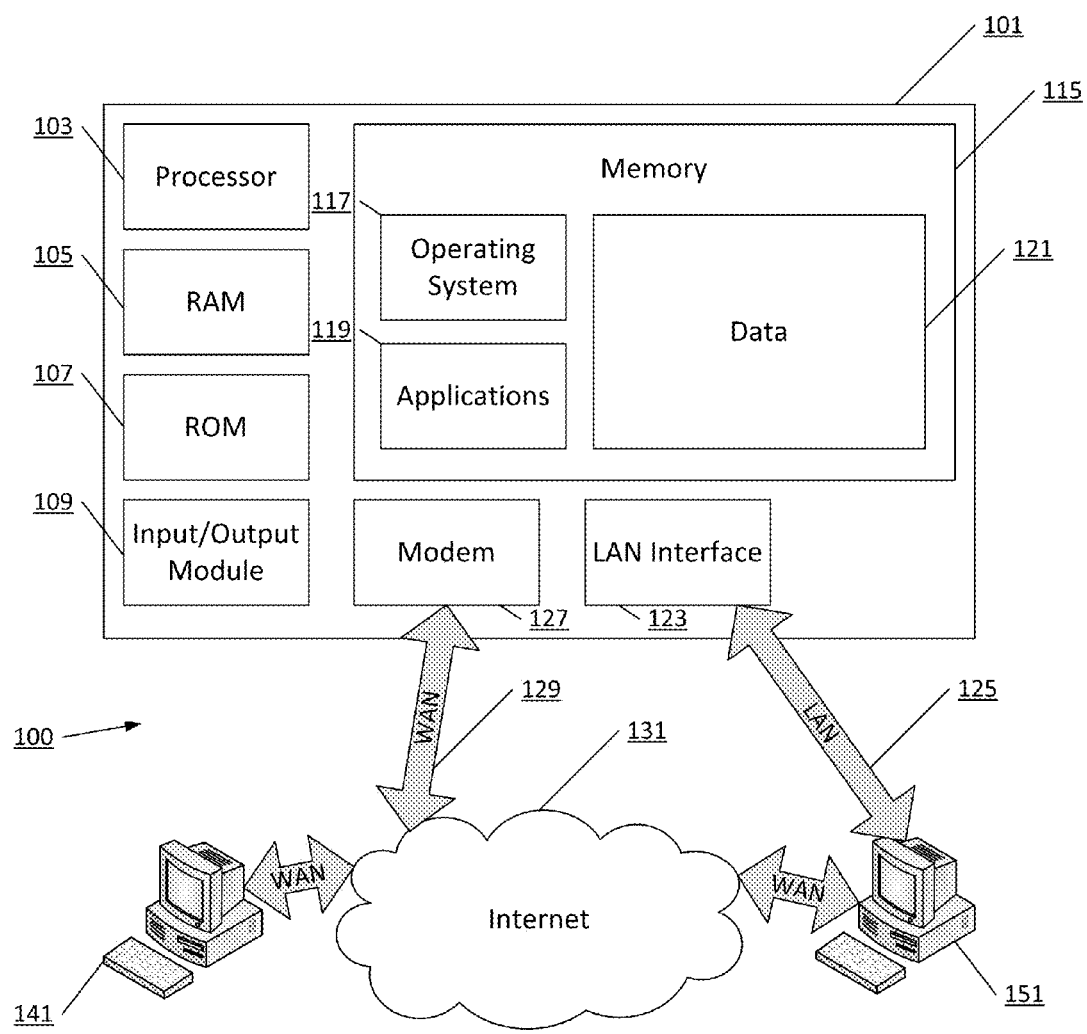
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above relative to the generic computing device 101. The network connections depicted in FIG. 1A include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
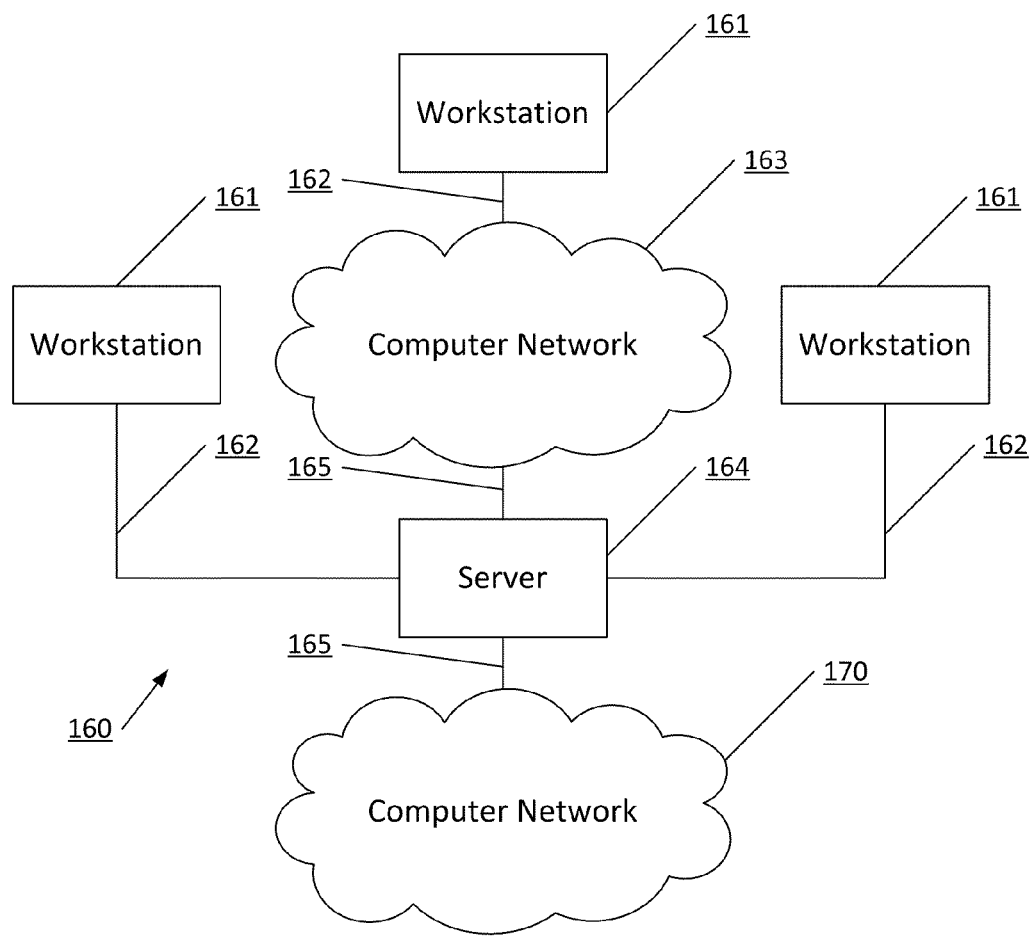
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and the like.

Figure 2:
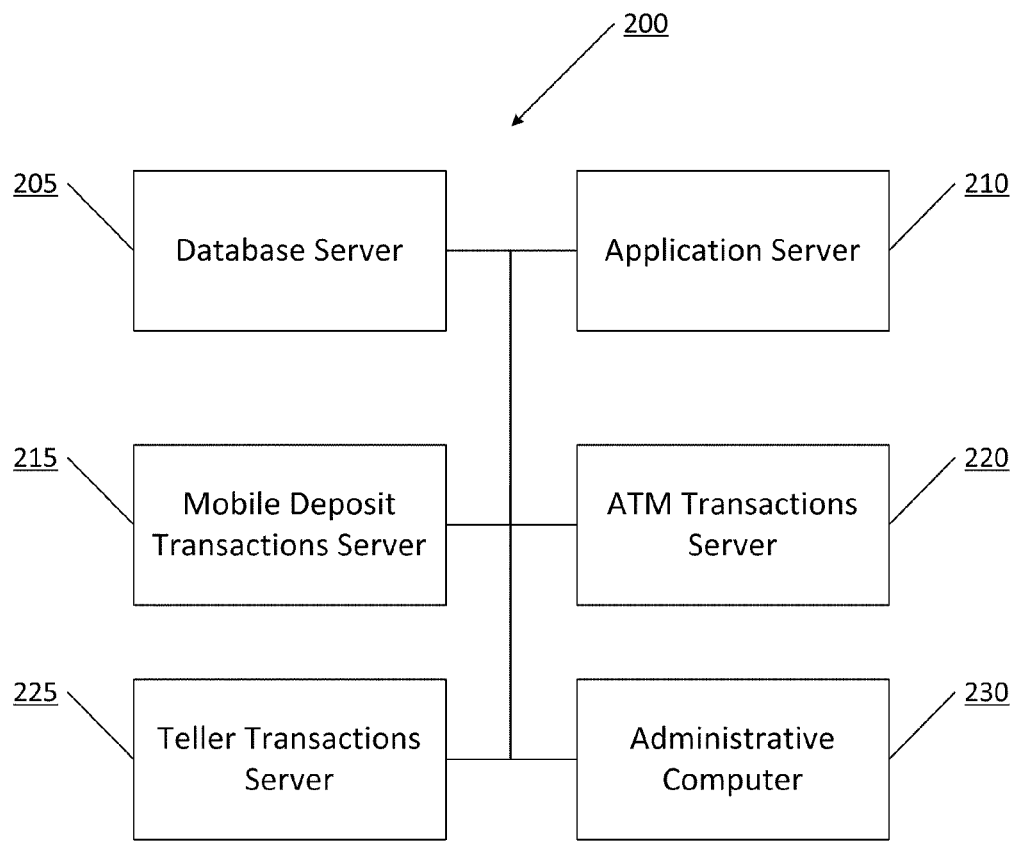
FIG. 2 illustrates an example network environment in which various aspects of the disclosure may be implemented.

FIG. 2 illustrates an example network environment in which various aspects of the disclosure may be implemented. Network environment 200 may include several computing devices that may be communicatively linked by a network. For example, network environment 200 may include database server 205, application server 210, mobile deposit transactions server 215, automated teller machine ("ATM") transactions server 220, teller transactions server 225, and administrative computer 230.

In one or more arrangements, database server 205 may store information about one or more financial documents, financial accounts, customers of a financial institution, and/or other information. For example, database server may store image data associated with one or more financial documents, such as checks and/or other negotiable instruments, and this stored image data may be used in processing one or more financial documents, as further described below. Image data may include, for example, a scanned electronic image of a physical financial document such as a check, deposit slip, and the like.

In at least one arrangement, application server 210 may store and/or execute computer readable instructions, including instructions for processing one or more financial documents. For example, application server 210 may store and execute computer readable instructions for analyzing and manipulating image data associated with financial documents, determining confidence scores for financial documents, authorizing transactions involving financial documents, and otherwise performing one or more steps of the methods further described below.

In at least one arrangement, mobile deposit transactions server 215 may store and/or execute computer readable instructions for receiving image data associated with one or more financial documents. For example, mobile deposit transactions server 215 may store and execute computer readable instructions for receiving image data associated with one or more financial documents (e.g., pictures of checks to be deposited) from mobile devices, such as cellular phones.

In at least one arrangement, ATM transactions server 220 and/or teller transactions server 225 also may store and/or execute computer readable instructions for receiving image data associated with one or more financial documents. For example, ATM transactions server 220 may store and execute computer readable instructions for receiving pictures of checks to be deposited from ATMs, and teller transactions server 225 may store and execute computer readable instructions for receiving pictures of checks to be deposited via traditional deposit channels (e.g., with a teller at a branch office of a financial institution).

In at least one arrangement, administrative computer 230 may provide one or more user interfaces that enable a variety of functions, including system configuration, system status monitoring, system activity logging, and/or other functions. These user interfaces may allow a user to configure and/or interact with a system implementing one or more aspects of the disclosure.

While network environment 200 is described as including various computers adapted to perform various functions, it should be understood that the system may be modified to include a greater or lesser number of computers which may be used alone or in combination to provide the same functionality. For example, a single computer may be used to perform all of the functions described, and one or more users may interact with the single computer through one or more terminals and/or user interfaces. In another example, a first computer may be used to perform all of the functions of database server 205 and application server 210, a second computer may be used to perform all of the functions of mobile deposit transactions server 215 and ATM transactions server 220, and a third computer may be used to perform all of the functions of teller transactions server 225 and administrative computer 230. Various other combinations of functionality and computers are possible without departing from the scope of the present disclosure.

Figure 3:
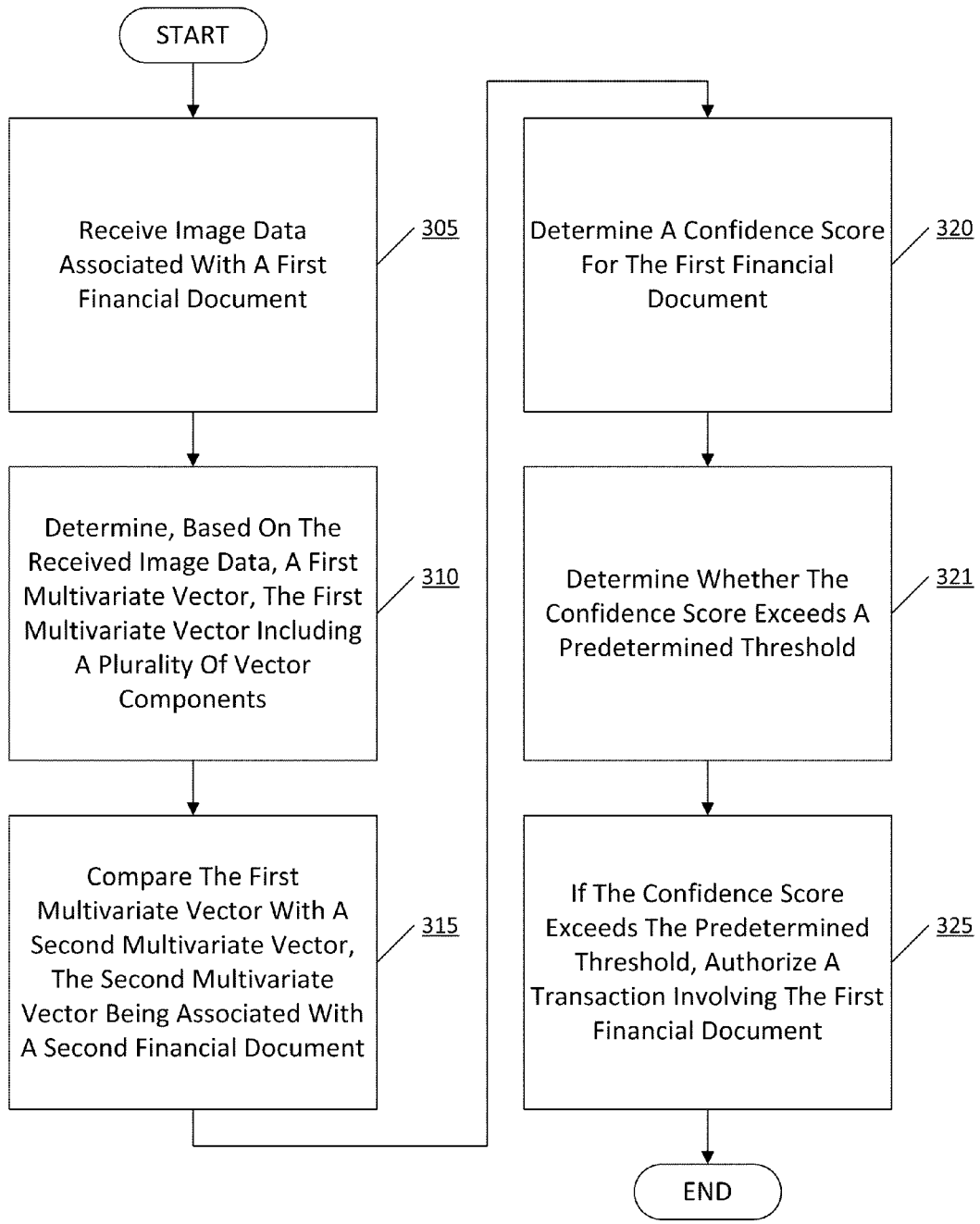
FIG. 3 illustrates an example method by which one or more financial documents may be processed according to one or more aspects described herein.

FIG. 3 illustrates an example method by which one or more financial documents may be processed according to one or more aspects described herein. According to one or more aspects, the methods described herein may be implemented by software executed on one or more computers, such as computing device 101 of FIG. 1A, and/or in a network environment, such as network environment 200 of FIG. 2.

Referring to FIG. 3, in step 305, image data associated with a first financial document may be received. For example, an image of a check to be deposited with a financial institution may be received by a system implementing one or more aspects of the disclosure. The image data may be received by the system from a customer of the financial institution via a variety of channels. For instance, the customer may have deposited the check at a branch office of the financial institution with a bank teller, and the image of the check may be received via a computing device associated with the bank teller. Alternatively, the customer may have deposited the check in an ATM associated with the financial institution, and the image of the check may be received via a computing device associated with the ATM. Alternatively, the customer may have deposited the check using a mobile device, such as a cellular phone or a personal digital assistant ("PDA"), and the image of the check may be received through a network from the mobile device.

In step 310, a first multivariate vector (e.g., a set of one or more line segments) may be determined based on the received image data. The first multivariate vector may include a plurality of vector components, and each vector component may represent a distance from an edge of the first financial document to a feature of the first financial document, such as printed or handwritten text or a line or shape appearing on the first financial document. By determining such a vector, the system may be able to create a unique profile for the first financial document, which the system subsequently may use in comparing the first financial document with other financial documents, in determining whether the first financial document is legitimate or deceptive, in determining whether the first financial document has already been deposited (e.g., via another channel), and/or in evaluating other concerns associated with the first financial document.

For example, the system may analyze an image of a check to be deposited by determining a plurality of distances and by storing the determined plurality of distances as a multivariate vector. Each distance may represent the distance from an edge of the check to a particular feature of the check. According to one or more aspects, a feature may be identified by a change in brightness or color of a particular degree between adjacent or nearby pixels. For instance, a small change in brightness between pixels (e.g., a difference in brightness of 5% or less) might not represent a feature, whereas a significant change in brightness between pixels (e.g., a difference in brightness of more than 5%) may represent a feature. Determining vector components, analyzing image data, and determining features are further described below with respect to FIG. 7. Once a plurality of distances and a corresponding multivariate vector are determined for the first financial document, the multivariate vector may represent a profile for the first financial document and may be used in identifying the first financial document.

In step 315, the first multivariate vector may be compared with a second multivariate vector, and the second multivariate vector may be associated with a second financial document. The second financial document may be a financial document previously received, analyzed, and/or processed by the system (e.g., a previously received and deposited check). Image data associated with the second financial document may be stored and/or retrieved from a database by the system, and the second multivariate vector may be determined based on such image data. Additionally or alternatively, the second multivariate vector already may have been determined by the system, and thus the second multivariate vector also may be stored and/or retrieved from a database by the system. Furthermore, the second financial document may be chosen randomly from a database of previously received financial documents, or the second financial document may be chosen sequentially from such a database. By comparing the first multivariate vector with the second multivariate vector, the system may be able to determine whether the first financial document and the second financial document are the same document, which may indicate that the first financial document is improper (e.g., a photocopy) and/or that the first financial document has already been deposited (e.g., via another channel in which a financial document, such as a check, is not surrendered when it is deposited with a financial institution).

For example, the system may compare the individual vector components of the first multivariate vector with the corresponding individual vector components of the second multivariate vector. If the system determines, based on this comparison, that a threshold number of the vector components of the first multivariate vector are similar or identical to the vector components of the second multivariate vector (e.g., if one or more of the vector components of the first multivariate vector are within 5% of the length of the one or more corresponding vector components of the second multivariate vector), the system then may determine that the first financial document and the second financial document are the same document. In this example scenario, to the extent that there are slight differences between the first multivariate vector and the second multivariate vector (e.g., differences in length of corresponding vector components of 5% or less), such differences may be attributable to slight differences between the images, rather than differences in the document that is the subject of the images. On the other hand, if the system determines, based on the comparison, that the vector components of the first multivariate vector are not similar (e.g., if one or more of the vector components of the first multivariate vector are not within 5% of the length of the one or more corresponding vector components of the second multivariate vector) or identical to the vector components of the second multivariate vector, the system then may determine that the first financial document and the second financial documents are in fact different documents. Determining that the first financial document and the second financial documents are different documents may allow a financial institution processing the first financial document to have more confidence in the legitimacy and validity of the first financial document.

In step 320, a confidence score for the first financial document may be determined. Such a confidence score may represent a level of confidence a financial institution may have in the legitimacy and/or validity of the first financial document (e.g., a check to be deposited). Determining a confidence score may be based on the comparison of the first multivariate vector and the second multivariate vector.

For instance, as the system compares the individual vector components of the first multivariate vector with the corresponding individual vector components of the second multivariate vector, the system may calculate an amount of variance between each pair of corresponding vector components. An amount of variance may be calculated, for example, by subtracting the length of a particular vector component of the second multivariate vector from the length of a corresponding vector component of the first multivariate vector. Additionally or alternatively, an amount of variance may be expressed as a percentage or ratio, which may be computed by dividing the difference computed in the previous example by the length of the corresponding vector component of the first multivariate vector. Then, the system may sum each of these amounts of variance, and the sum may represent the confidence score for the first financial document. The greater the amount of variance between the first multivariate vector and the second multivariate vector (and thus, the greater the amount of variance between the first financial document and the second financial document), the more confidence a financial institution may have in the legitimacy and validity of the first financial document (e.g., because the first financial document might not be a copy of the second financial document), and correspondingly, the greater the confidence score may be. On the other hand, the smaller the variance between the first multivariate vector and the second multivariate vector (and thus, the lesser the amount of variance between the first financial document and the second financial document), the less confidence a financial institution may have in the legitimacy and validity of the first financial document (e.g., because the first financial document might be a copy of the second financial document), and correspondingly, the lower the confidence score may be.

Additionally or alternatively, an overall confidence score for a particular financial document (e.g., the first financial document) may represent a sum of amounts of variance computed by comparing the particular financial document to a plurality of other financial documents. For example, the system may compare the individual vector components of the first multivariate vector with the corresponding individual vector components of the second multivariate vector, and the system may calculate an amount of variance between each pair of corresponding vector components. Then, the system may sum each of these amounts of variance, and the sum may represent a first confidence score for the first financial document. Subsequently, the system may compare the individual vector components of the first multivariate vector with the corresponding individual vector components of a third multivariate vector, the third multivariate vector being associated with a third financial document, and the system may calculate an amount of variance between each pair of corresponding vector components. Then, the system may sum each of these amounts of variance, and the sum may represent a second confidence score for the first financial document. Thereafter, the system may determine an overall confidence score for the first financial document by calculating the sum of the first confidence score and the second confidence score.

In at least one additional arrangement, the system may emphasize certain vector components over others by multiplying one or more particular amounts of variance by a weight. A financial institution may wish for the system to emphasize certain vector components because it may be determined that some vector components vary from document to document more than others, and the more that vector components vary from document to document, the more useful they may be in profiling and/or identifying a particular document. For instance, a financial institution may wish for the system to emphasize vector components associated with the middle area of checks being processed, rather than the side areas of the checks, because the features of the middle area of the checks may identify the checks more uniquely (as such middle areas may vary more from check to check). Thus, the system may multiply one or more amounts of variance associated with the middle area of checks by a number greater than one, and/or the system m ay multiply one or more amounts of variance associated with the other area of checks by a number less than one.

For example, an example first multivariate vector associated with an example first check may include a first vector component of length "6%" and a second vector component of length "64%." An example second multivariate vector associated with an example second check may include a third vector component of length "5%" and a fourth vector component of length "48%." The first vector component and the third vector component may correspond to a first position, the first position being located in the left side area of each check, and the second vector component and the fourth vector component may correspond to a second position, the second position being located in the middle area of each check. Thus, the system may determine an amount of variance for the first position to be "1%" and an amount of variance for the second position to be "16%." Then, the system may weight the computed amounts of variance before summing them to compute a confidence score. For instance, the system may multiply the amount of variance for the first position by "0.5," which may deemphasize the amount of variance between the vector components associated with the first position because the first position may be located in the left side area of each check. In addition, the system may multiply the amount of variance for the second position by "4," which may emphasize the amount of variance between the vector components associated with the second position because the second position may be located in the middle area of each check. Next, the system may sum the weighted amounts of variance to determine a confidence score, which thus may be [(0.5×1)+(16×4)] or 64.5.

In step 321, it may be determined whether the confidence score exceeds a predetermined threshold. The predetermined threshold may be set by a financial institution processing the first financial document in accordance with legal, regulatory, and internal compliance concerns. Additionally or alternatively, the predetermined threshold may be determined automatically by the system based on deception statistics and/or other factors, as further described below with respect to FIG. 5.

In step 325, a transaction involving the first financial document may be authorized if the confidence score exceeds the predetermined threshold. On the other hand, if the confidence score does not exceed the predetermined threshold, the method may end. For example, the system may authorize a transaction involving a first check to be deposited because a first confidence score associated with the first check exceeds a predetermined threshold. But the system might not authorize a transaction involving a second check to be deposited because a second confidence score associated with the second check does not exceed the predetermined threshold.

Figure 4:
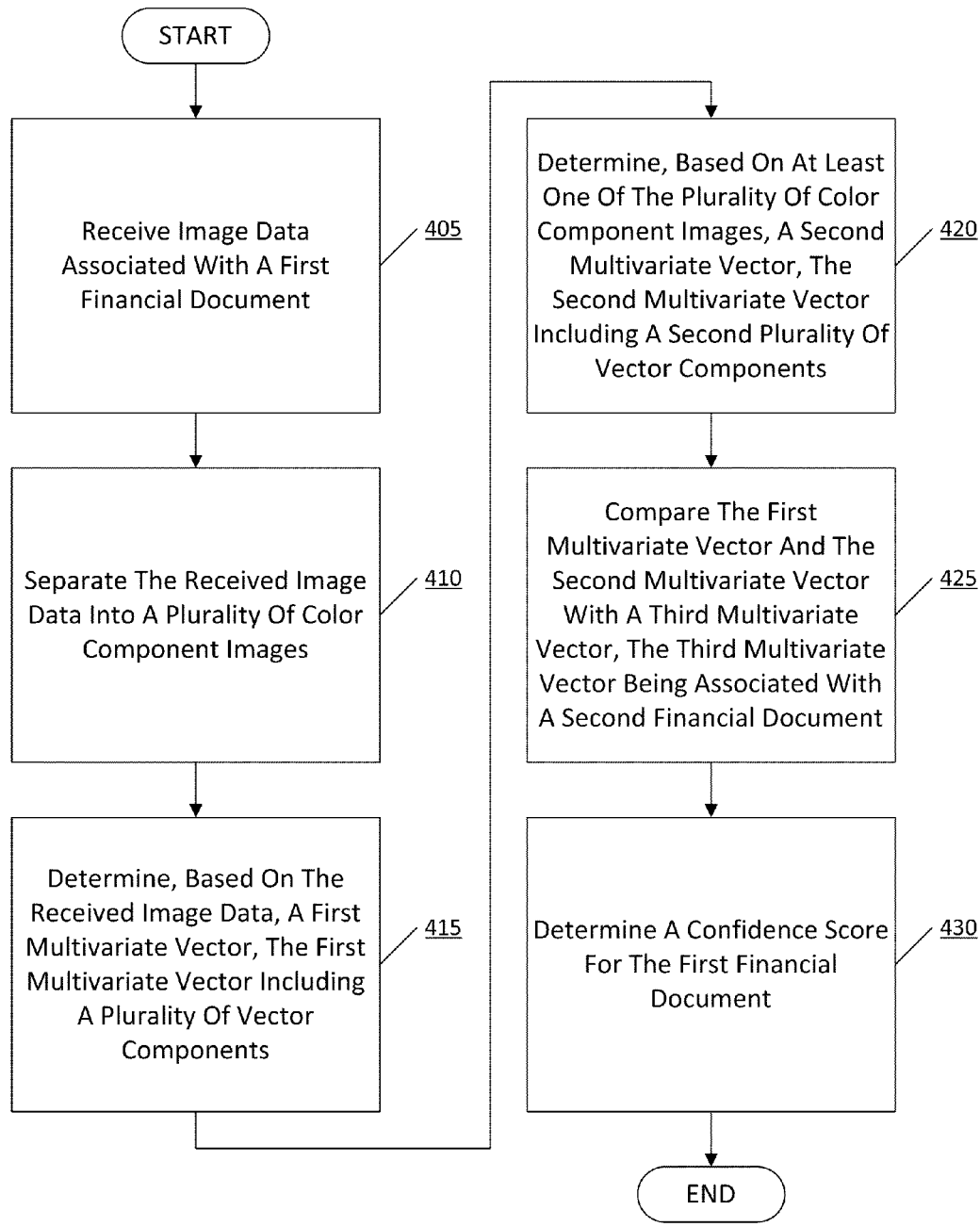
FIG. 4 illustrates an example method by which a confidence score for one or more financial documents may be determined according to one or more aspects described herein.

FIG. 4 illustrates an example method by which a confidence score for one or more financial documents may be determined according to one or more aspects described herein. In step 405, image data associated with a first financial document may be received. For example, as in step 305 of FIG. 3, an image of a check to be deposited with a financial institution may be received by a system implementing one or more aspects of the disclosure.

In step 410, the received image data may be separated into a plurality of color component images. By separating the received image data into a plurality of color component images, the system may be able to analyze an image of a financial document in an increased number of ways, thereby improving the precision and accuracy of comparisons and other processing operations performed by the system. For example, the system may separate the received image of the check to be deposited with the financial institution into red, green, and blue ("RGB") color components and/or into cyan, magenta, yellow, and key black color components ("CMYK"). Once the received image of the check is separated into color component images, the color component images may be used by the system in processing the financial document, as further described below.

In step 415, a first multivariate vector may be determined based on the received image data. Similar to the process of step 310 of FIG. 3, the first multivariate vector may include a plurality of vector components, and each vector component may represent a distance from an edge of the first financial document to a feature of the first financial document. In determining the first multivariate vector in step 415, the system may analyze the received image data as it was received (e.g., with all colors combined) and/or the system may analyze one of the color component images.

In step 420, a second multivariate vector may be determined based on at least one of the plurality of color component images. Like the first multivariate vector, the second multivariate vector may include a plurality of vector components, and each vector component may represent a distance from an edge of the first financial document to a feature of the first financial document. For example, in step 420, the system may analyze an image of a check to be deposited, similar to how the system may perform such analysis in step 310 of FIG. 3, but the system may analyze one of the color component images (e.g., a cyan, magenta, yellow, or key black color component image) rather than the image data as it was received (e.g., with all the colors combined).

In step 425, the first multivariate vector and the second multivariate vector may be compared with a third multivariate vector, the third multivariate vector being associated with a second financial document. For example, the system may compare the individual vector components of the first multivariate vector with the corresponding individual vector components of the third multivariate vector. In addition, the system may compare the individual vector components of the second multivariate vector with the corresponding individual vector components of the third multivariate vector.

Additionally or alternatively, the system may compare the first multivariate vector with the third multivariate vector, where both the first multivariate vector and the third multivariate vector are associated with a first color component (e.g., cyan, magenta, yellow, or key black), and where the first multivariate vector is associated with the first financial document and the third multivariate vector is associated with the second financial document. Further, the system may compare the second multivariate with the fourth multivariate vector, where both the second multivariate vector and the fourth multivariate vector are associated with a second color component different from the first color component, and where the second multivariate vector is associated with the first financial document and the fourth multivariate vector is associated with the second financial document.

In step 430, a confidence score for the first financial document may be determined. Similar to step 320 of FIG. 3, determining a confidence score may be based on the comparing of the first multivariate vector and the second multivariate vector with the third multivariate vector. Additionally or alternatively, determining a confidence score may be based on comparing the first multivariate vector and the second multivariate vector, associated with the first financial document, with the third multivariate vector and a fourth multivariate vector, associated with the second financial document, as further described above. In addition, and also as further described above, as the system compares pairs of corresponding vector components, the system may calculate an amount of variance between each pair of corresponding vector components. Then, the system may sum each of these amounts of variance, and the sum may represent the confidence score for the first financial document.

Figure 5:
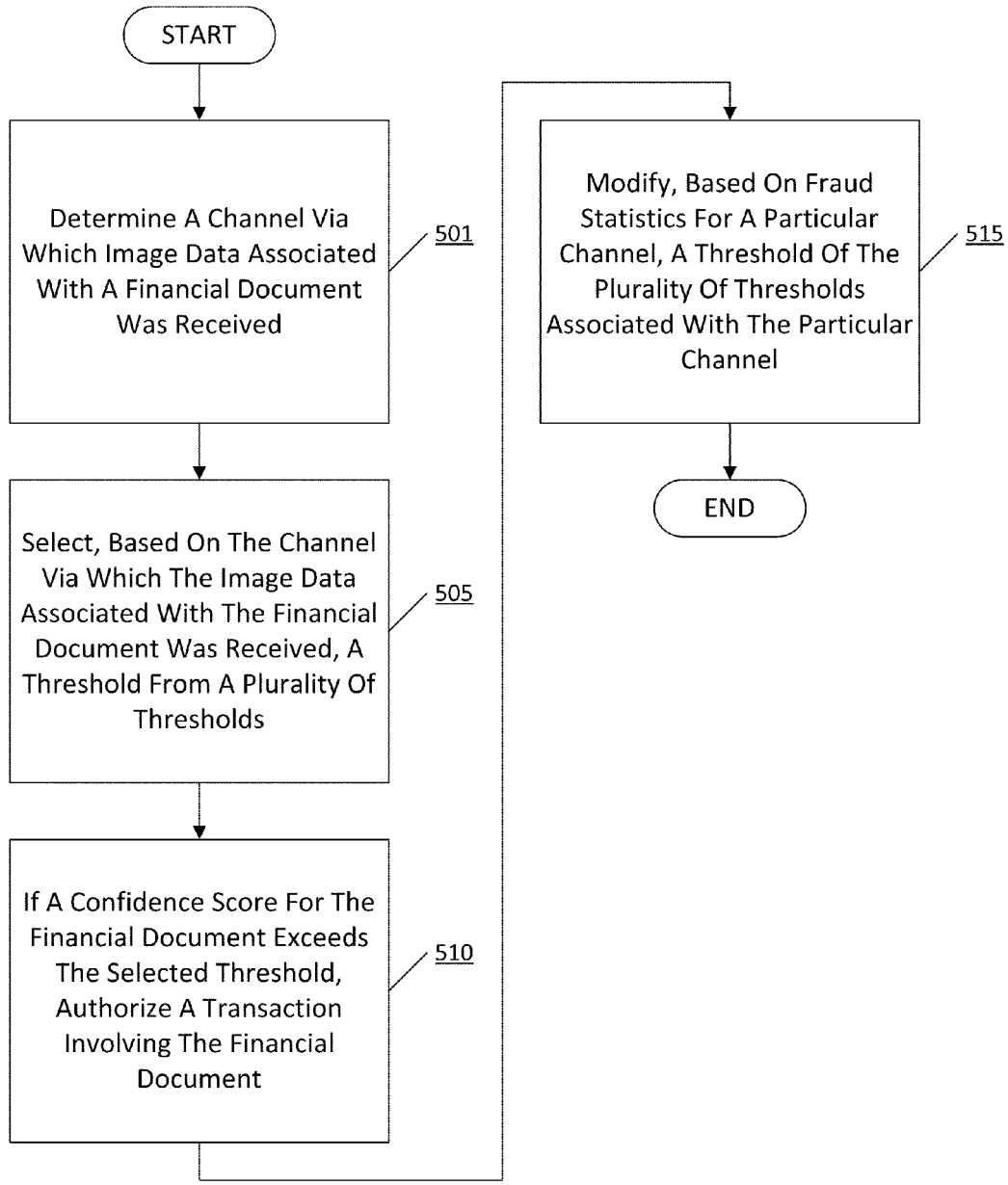
FIG. 5 illustrates an example method by which a confidence score threshold may be modified according to one or more aspects described herein.

FIG. 5 illustrates an example method by which a confidence score threshold may be modified according to one or more aspects described herein. In one or more arrangements, a financial institution implementing one or more aspects of the disclosure may wish to implement a scheme in which the threshold confidence score for authorizing a transaction involving a financial document varies depending on the way in which the financial document was received. For instance, a financial institution may implement a threshold scheme in which a lower confidence score may be required to authorize the depositing of a check that was received by a bank teller of the financial institution, because a typical bank teller may exercise some independent judgment and reasoning that would prevent a photocopy of a check from being deposited. On the other hand, in the same scheme, a higher confidence score may be required to authorize the depositing of a check that was received only electronically as an image from a cellular phone, because in such a situation, there may be little to prevent a photocopy of a check from being deposited or to prevent the same check from being deposited multiple times.

In step 501, a channel via which image data associated with a financial document was received may be determined. For example, within a financial institution, there may be a plurality of deposit channels via which image data associated with checks to be deposited and/or other documents may be received. For instance, there may be a "teller transactions" channel, via which image data may be received via a bank teller of the financial institution. There also may be an "ATM transactions" channel, via which image data may be received via one or more ATMs associated with the financial institution. In addition, there may be a "mobile deposit transactions" channel, via which image data may be received via one or more mobile devices associated with one or more customers of the financial institution. Thus, the system may determine, for example, via which channel image data associated with a check was received.

In step 505, a threshold may be selected from a plurality of thresholds based on the channel via which the image data associated with the financial document was received. For example, the plurality of thresholds may include a first threshold, a second threshold, and a third threshold. The first threshold may be associated with the "teller transactions" channel, the second threshold may be associated with an "ATM transactions" channel, and the third threshold may be associated with a "mobile deposit transactions" channel. In addition, the second threshold may be greater than the first threshold because the financial institution may consider the "ATM transactions" channel to be more susceptible to deceptive activity or abuse than the "teller transactions" channel. The third threshold may be greater than the second threshold because the financial institution may consider the "mobile deposit transactions" channel to be even more susceptible to deceptive activity or abuse than the "ATM transactions" channel.

In one example, first image data associated with a first financial document may be received via the "teller transactions" channel. Accordingly, the system may select the first threshold as the threshold to be used in analyzing the first financial document, because the first threshold may be associated with the "teller transactions" channel. In another example, second image data associated with a second financial document may be received via the "ATM transactions" channel. Thus, in this example, the system may select the second threshold as the threshold to be used in analyzing the second financial document, because the second threshold may be associated with the "ATM transactions" channel. Further, because the second threshold may be greater than the first threshold, a higher confidence score may be required to authorize a transaction involving the second financial document, whereas a lower confidence score may be required to authorize a transaction involving the first financial document.

In yet another example, third image data associated with a third financial document may be received via the "mobile deposits" channel. Accordingly, the system may select the third threshold as the threshold to be used in analyzing the third financial document, because the third threshold may be associated with the "mobile deposits" channel. In addition, because the third threshold may be greater than the second threshold, an even higher confidence score may be required to authorize a transaction involving the third financial document than the confidence score that may be required to authorize a transaction involving the second financial document.

In step 510, a transaction involving the financial document may be authorized if a confidence score for the financial document exceeds the selected threshold. For example, the system may receive and/or determine a confidence score for a financial document (e.g., a check to be deposited), as further described above, and the system may compare the confidence score for the financial document with the selected threshold. If the confidence score for the financial document exceeds the selected threshold, the system may authorize a transaction involving the financial document (e.g., the system may allow the check to be deposited and/or may credit and/or debit associated financial accounts). On the other hand, if the confidence score for the financial document does not exceed the selected threshold, the system might not authorize a transaction involving the financial document (e.g., the system may reject the check, prohibiting it from being deposited).

In at least one additional arrangement, if the confidence score is within a particular range of the selected threshold (e.g., 5% above the selected threshold or 5% below the selected threshold), the system may authorize a transaction involving the financial document, but the system also may flag the financial document for further review. For instance, if a confidence score for a check to be deposited is 5% above the relevant threshold, the system may allow the check to be deposited, but the system also may flag the check, such that additional review of the check will be conducted later (e.g., the system may reanalyze the check or a user may inspect the check manually).

In step 515, a threshold of the plurality of thresholds associated with the particular channel may be modified based on deception statistics for a particular channel. Deception statistics may include statistics related to the number of deceptive transactions in a particular channel, the number of checks received via a particular channel that later bounced, and/or other information. By modifying a threshold based on channel-specific deception statistics, the system may be able to adjust to fluctuations in illegitimate and/or deceptive checks and/or transactions in particular deposit channels.

For example, the system may receive and/or determine deception statistics indicating that there have been few deceptive transactions (e.g., less than thirty deceptive transactions per month) in the "teller transactions" channel (e.g., because few checks deposited via the "teller transactions" channel have bounced). Accordingly, the system may reduce the threshold confidence score associated with the "teller transactions" channel automatically by a predefined amount. Alternatively, the threshold confidence score may be reduced manually by a user-specified amount. The determination as to whether an adjustment is necessary may be made based on a predefined schedule (e.g., once a month), upon reaching a certain number of transactions (e.g., every 1,000 transactions), manual initiation, and the like. In another example, the system may receive and/or determine deception statistics indicating that there have been many deceptive transactions in the "mobile deposit transactions" channel (e.g., because many checks deposited via the "mobile deposit transactions" channel have bounced). Accordingly, the system automatically may raise the threshold confidence score associated with the "mobile deposit transactions" channel.

Figure 6:
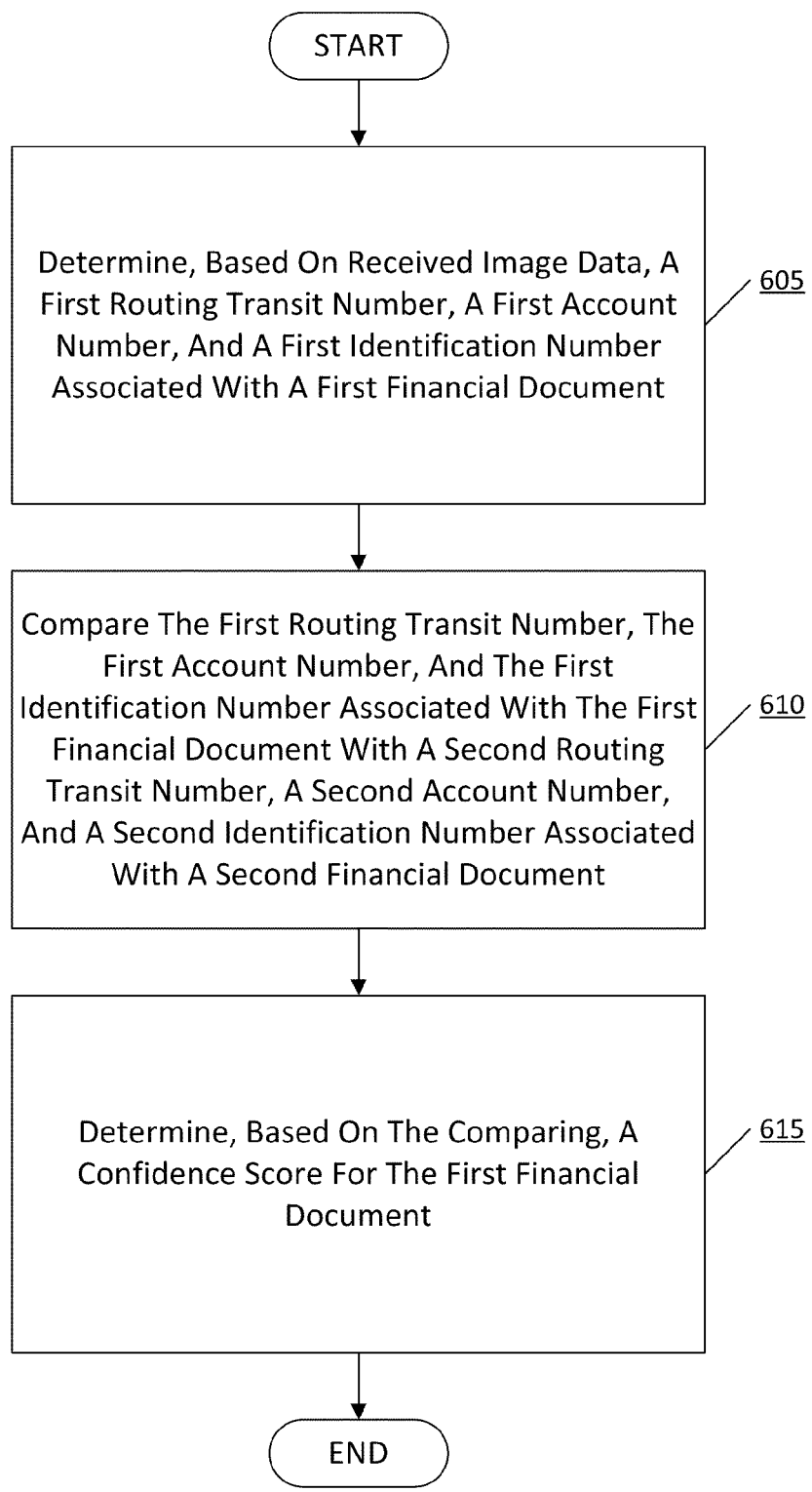
FIG. 6 illustrates another example method by which a confidence score for one or more financial documents may be determined according to one or more aspects described herein.

FIG. 6 illustrates another example method by which a confidence score for one or more financial documents may be determined according to one or more aspects described herein. In some instances, a financial institution or any other entity implementing one or more aspects of the disclosure may wish to analyze a financial document (e.g., a check to be deposited) using a multivariate vector analysis, as further described above, and also account for additional information associated with the financial document. Thus, in at least one arrangement, a system implementing one or more aspects of the disclosure may analyze printed text on a financial document (e.g., using optical character recognition ("OCR") technology). For instance, where the financial document is a check to be deposited, the check may include one or more magnetic ink character recognition ("MICR") characters that indicate a routing number, an account number, an identification number, and/or other information associated with the check. By analyzing these MICR characters, the system may be able to analyze financial documents, such as checks to be deposited, in yet another way.

In step 605, a first routing transit number, a first account number, and/or a first identification number associated with a first financial document may be determined based on received image data. For example, the system may receive an image of a check to be deposited, and the system may use OCR technology to determine, based on the received image of the check, a routing number, an account number, and a check number associated with the check.

In step 610, the first routing transit number, the first account number, and the first identification number associated with the first financial document may be compared with a second routing transit number, a second account number, and a second identification number associated with a second financial document. For example, with respect to the received image of the check in the example above, the system may compare the routing number, the account number, and the check number with a routing number, an account number, and a check number of another check. The system may determine whether the routing numbers, the account numbers, and the check numbers of the two checks match exactly. Additionally or alternatively, the system may determine whether the routing numbers, the account numbers, and the check numbers of the two checks are similar, as if these numbers are different by only a few digits, such differences might be attributable to variations in OCR or image processing rather than an actual difference in the two checks.

In step 615, a confidence score for the first financial document may be determined based on the comparing. The determined confidence score may be used by the system in determining whether to authorize a transaction, as further described above. For example, with respect to the comparing in the example above, the system may determine a high confidence score if the routing numbers, the account numbers, and the check numbers of the two check images do not match and are not similar. On the other hand, the system may determine a low confidence score if the routing numbers, the account numbers, and the check numbers of the two check images do not match but are similar. If the system determines that the routing numbers, the account numbers, and the check numbers of the two check images are the same, the system may return a confidence score of zero, which may reflect the system's determination that the two check images are images of the same check.

Confidence scores may be generated using a variety of processes including the methods of FIGS. 4-6 and/or combinations thereof. For example, confidence scores may be derived by assigning a value to a determination of whether certain text printed on a financial document matches text printed on another financial document and by adding such a value to a confidence score generated based on a multivariate feature vector.

Figure 7:
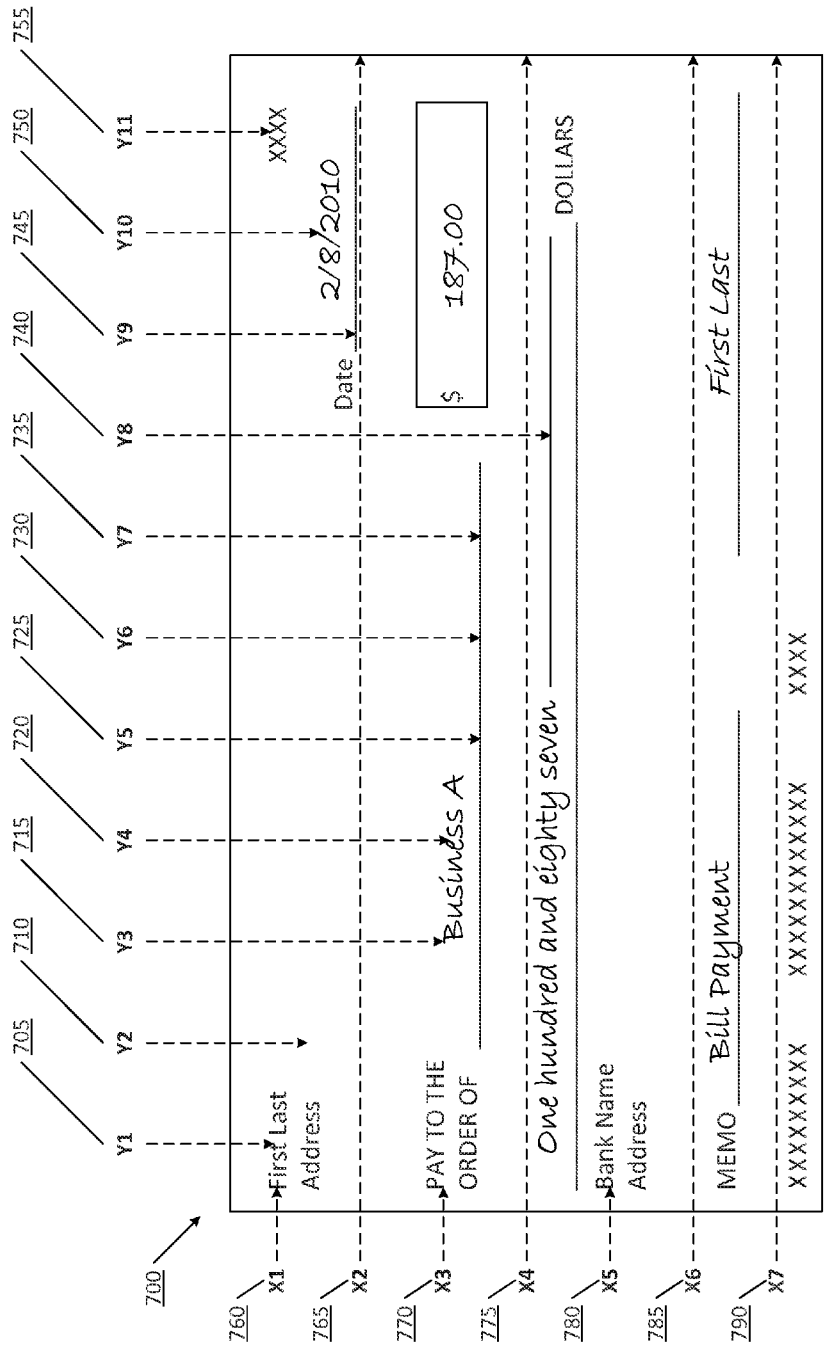
FIG. 7 illustrates an example financial document for which a confidence score may be determined according to one or more aspects described herein.

FIG. 7 illustrates an example financial document for which a confidence score may be determined according to one or more aspects described herein. As described above, a system implementing one or more aspects of the disclosure may analyze image data associated with a financial document, such as a check to be deposited, to determine a multivariate vector, which then may be used by the system in comparing the financial document with other financial documents to determine a confidence score. As also described above, the multivariate vector that results from the analysis of the received image data may include a plurality of vector components, where each vector component may represent a distance from an edge of the financial document to a feature of the financial document.

As illustrated in FIG. 7, a financial document, such as check 700, may include a plurality of features, such as printed and handwritten text. In analyzing check 700, a system implementing one or more aspects of the disclosure may determine a multivariate vector. The multivariate vector may include a plurality of vector components, and the vector components may be oriented in different axes and/or in different directions. For instance, the multivariate vector illustrated in FIG. 7 includes seven vector components in the X-axis (e.g., vector components 760, 765, 770, 775, 780, 785, and 790) and eleven vector components in the Y axis (e.g., vector components 705, 710, 715, 720, 725, 730, 735, 740, 745, 750, and 755). It should be understood that a multivariate vector may include a greater or lesser number of vector components in the same or different axes and/or directions. For instance, the multivariate vector illustrated in FIG. 7 could also include seven additional vector components in the X-axis originating from another direction (e.g., the right side of check 700), as well as eleven additional vector components in the Y-axis originating from another direction (e.g., the bottom side of check 700). By including a greater number of vector components in the multivariate vector, the system may be able to more precisely and uniquely analyze and identify images of financial documents, such as checks to be deposited. As a greater number of vector components are included in the multivariate vector, however, the system may have to perform an increased amount of processing to perform such analysis.

In one or more arrangements, and as described above, each vector component of the multivariate vector may represent a distance from an edge of the first financial document to a feature of the first financial document. A feature may be identified by a change in brightness or color of a particular degree between pixels. For instance, a small change in brightness between pixels (e.g., a difference in brightness of 5% or less) might not identify a feature, whereas a significant change in brightness between pixels (e.g., a difference in brightness of more than 5%) may identify a feature.

Thus, with respect to the multivariate vector illustrated in FIG. 7, vector component 705 may start at the top edge of check 700 and end at the printed "t" in the word "First," as that is the first feature encountered from the top edge of the check at that position. Similarly, vector component 720 may start at the top edge of check 700 and end at the handwritten "e" in the word "Business." Vector component 775 may start at the left edge of check 700 and end at the right edge of check 700 because no feature was encountered from the left edge of the check at that position.

In at least one arrangement, one or more of the vector components of a multivariate vector may be expressed as ratios of distances in relation to the total height or width of the financial document. By expressing the vector components as ratios, variations in image size may be accounted for, as the size of the financial document itself may be more significant when analyzing and/or comparing financial documents than the size of the image of the financial document being analyzed and/or compared. For instance, with respect to the multivariate vector illustrated in FIG. 7, vector component 705 may have a value of "7%," which may represent a percentage ratio of two distances, the first distance being the distance from the top edge of the check to the printed "t" in the word "First," and the second distance being the distance from the top edge of the check to the bottom edge of the check. In other words, vector component 705 may have a value of "7%" because the length of vector component 705 (e.g., the distance from the top edge of the check to the printed "t" in the word "First," which represents the first feature encountered from the top edge of the check in that position) may be 7% of the total height of check 700. On the other hand, vector component 775 may have a value of "100%" because the length of vector component 775 may be the total width of the check, as no feature was encountered from the left edge of the check to the right edge of the check at that position.

As described above, in at least one arrangement, one or more vector components may be emphasized over one or more other vector components in analyzing images of financial documents. A financial institution implementing one or more aspects of the disclosure may wish to emphasize one or more vector components because some financial documents may include elements that are very similar and/or similarly positioned. For instance, vector component 705 may often encounter the name of an account holder associated with a check, because it may be the case that the name of an account holder associated with most checks related to the financial institution appears in the same place on all of such checks. Thus, it may be desirable to deemphasize vector component 705 when analyzing check 700 (e.g., by multiplying a confidence score corresponding to vector component 705 by a fractional or zero weight), as variations in that vector component more likely may result from image processing errors rather than actual differences between checks. On the other hand, vector component 720 may often encounter handwritten text at a position that varies from check to check, as vector component 720 may be positioned such that it often encounters the payee name written on a check. Thus, it may be desirable to emphasize vector component 720 when analyzing check 700 (e.g., by multiplying a confidence score corresponding to vector component 720 by a number greater than one). In these ways, vector components may be emphasized.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   receiving, by a computing device, image data depicting a first financial document;
   determining, by the computing device, based on the received image data, a distance from an edge of the depicted first financial document to a feature of the depicted first financial document by selecting a starting point along the edge and comparing adjacent pixels in a specific direction until a change in brightness or color between two adjacent pixels exceeds a predetermined threshold;
   generating a first vector, the first vector including at least one vector component, the at least one vector component representing the distance;
   comparing, by the computing device, the generated first vector with a second vector, the second vector being associated with a second financial document;
   determining, by the computing device, a confidence score for the first financial document based on the comparison, the confidence score indicating a level of confidence that the first financial document is valid;
   selecting, by the computing device, a threshold based on a classification of a channel through which the image data associated with the first financial document is received, wherein channels are classified as one of a teller transactions channel, an ATM transactions channel, and a mobile deposit transactions channel, and channels of a same classification have a same threshold; and
   in response to determining that the confidence score exceeds the selected threshold, authorizing, by the computing device, a transaction involving the first financial document.

2. The method of claim 1, further comprising:
   in response to determining that the confidence score exceeds a predetermined threshold, authorizing, by the computing device, a transaction involving the first financial document.

3. The method of claim 1, further comprising:
   modifying, by the computing device, the selected threshold based on deception statistics for a channel through which financial transaction information is received.

4. The method of claim 1, wherein the at least one vector component is a ratio of two distances, including a first distance which is the distance from the edge of the depicted first financial document to the feature of the depicted first financial document and a second distance which is the distance from the edge of the depicted first financial document to an opposite edge of the depicted first financial document.

5. The method of claim 1, further comprising:
   separating, by the computing device, the received image data into a plurality of color component images, each color component image being associated with a different color component of a color model; and
   determining, by the computing device, based on one of the separated color component images of the plurality of color component images, a third vector, the third vector including at least one third vector component, the at least one third vector component representing a distance from an edge of the depicted first financial document to a feature of the depicted first financial document.

6. The method of claim 1, further comprising:
   determining, by the computing device, based on the received image data, a first routing transit number, a first account number, and a first identification number associated with the first financial document; and
   comparing, by the computing device, the first routing transit number, the first account number, and the first identification number associated with the first financial document with a second routing transit number, a second account number, and a second identification number, respectively, associated with a second financial document.

7. The method of claim 1, wherein the first vector includes:
a first vector component representing a first distance from a first edge of the depicted first financial document to a first feature of the depicted first financial document; and
a second vector component representing a second distance from a second edge of the depicted first financial document to a second feature of the depicted first financial document, the second edge being different from the first edge.

8. One or more non-transitory computer-readable media having computer-executable instructions stored thereon that, when executed, cause an apparatus to:
receive image data depicting a first financial document;
determine, based on the received image data, a distance from an edge of the depicted first financial document to a feature of the depicted first financial document by selecting a starting point along the edge and comparing adjacent pixels in a specific direction until a change in brightness or color between two adjacent pixels exceeds a predetermined threshold;
generate a first vector, the first vector including at least one vector component, the at least one vector component representing the distance;
compare the generated first vector with a second vector, the second vector being associated with a second financial document;
determine a confidence score for the first financial document based on the comparison, the confidence score indicating a level of confidence that the first financial document is valid;
select a threshold based on a classification of a channel through which the image data associated with the first financial document is received, wherein channels are classified as one of a teller transactions channel, an ATM transactions channel, and a mobile deposit transactions channel, and channels of a same classification have a same threshold; and
in response to determining that the confidence score exceeds the selected threshold, authorize a transaction involving the first financial document.

9. The one or more non-transitory computer-readable media of claim 8, having additional computer-executable instructions stored thereon that, when executed, cause the apparatus to:
in response to determining that the confidence score exceeds a predetermined threshold, authorize a transaction involving the first financial document.

10. The one or more non-transitory computer-readable media of claim 8, having additional computer-executable instructions stored thereon that, when executed, cause the apparatus to:
modify the selected threshold based on deception statistics for a channel through which financial transaction information is received.

11. The one or more non-transitory computer-readable media of claim 8, wherein the at least one vector component is a ratio of two distances, including a first distance which is the distance from the edge of the depicted first financial document to the feature of the depicted first financial document and a second distance which is the distance from the edge of the depicted first financial document to an opposite edge of the depicted first financial document.

12. The one or more non-transitory computer-readable media of claim 8, having additional computer-executable instructions stored thereon that, when executed, cause the apparatus to:
separate the received image data into a plurality of color component images, each color component image being associated with a different color component of a color model; and
determine, based on one of the separated color component images of the plurality of color component images, a third vector, the third vector including at least one third vector component, the at least one third vector component representing a distance from an edge of the depicted first financial document to a feature of the depicted first financial document.

13. The one or more non-transitory computer-readable media of claim 8, having additional computer-executable instructions stored thereon that, when executed, cause the apparatus to:
determine, based on the received image data, a first routing transit number, a first account number, and a first identification number associated with the first financial document; and
compare the first routing transit number, the first account number, and the first identification number associated with the first financial document with a second routing transit number, a second account number, and a second identification number, respectively, associated with a second financial document.

14. The one or more non-transitory computer-readable media of claim 8, wherein the first vector includes:
a first vector component representing a first distance from a first edge of the depicted first financial document to a first feature of the depicted first financial document; and
a second vector component representing a second distance from a second edge of the depicted first financial document to a second feature of the depicted first financial document, the second edge being different from the first edge.

15. An apparatus, comprising:
a processor; and
memory storing computer-readable instructions that, when executed by the processor, cause the apparatus to:
receive image data depicting a first financial document;
determine, based on the received image data, a distance from an edge of the depicted first financial document to a feature of the depicted first financial document by selecting a starting point along the edge and comparing adjacent pixels in a specific direction until a change in brightness or color between two adjacent pixels exceeds a predetermined threshold;
generate a first vector, the first vector including at least one vector component, the at least one vector component representing the distance;
compare the generated first vector with a second vector, the second vector being associated with a second financial document;
determine a confidence score for the first financial document based on the comparison, the confidence score indicating a level of confidence that the first financial document is valid;
select a threshold based on a classification of a channel through which the image data associated with the first financial document is received, wherein channels are classified as one of a teller transactions channel, an ATM transactions channel, and a mobile deposit transactions channel, and channels of a same classification have a same threshold; and
in response to determining that the confidence score exceeds the selected threshold, authorize a transaction involving the first financial document.

16. The apparatus of claim 15, the memory further storing computer-readable instructions that, when executed by the processor, cause the apparatus to:
   in response to determining that the confidence score exceeds a predetermined threshold, authorize a transaction involving the first financial document.

17. The apparatus of claim 15, the memory further storing computer-readable instructions that, when executed by the processor, cause the apparatus to:
   modify the selected threshold based on deception statistics for a channel through which financial transaction information is received.

18. The apparatus of claim 15, wherein the at least one vector component is a ratio of two distances, including a first distance which is the distance from the edge of the depicted first financial document to the feature of the depicted first financial document and a second distance which is the distance from the edge of the depicted first financial document to an opposite edge of the depicted first financial document.

19. The apparatus of claim 15, the memory further storing computer-readable instructions that, when executed by the processor, cause the apparatus to:
   separate the received image data into a plurality of color component images, each color component image being associated with a different color component of a color model; and
   determine, based on one of the separated color component images of the plurality of color component images, a third vector, the third vector including at least one third vector component, the at least one third vector component representing a distance from an edge of the depicted first financial document to a feature of the depicted first financial document.

20. The apparatus of claim 15, the memory further storing computer-readable instructions that, when executed by the processor, cause the apparatus to:
   determine, based on the received image data, a first routing transit number, a first account number, and a first identification number associated with the first financial document; and
   compare the first routing transit number, the first account number, and the first identification number associated with the first financial document with a second routing transit number, a second account number, and a second identification number, respectively, associated with a second financial document.

21. The apparatus of claim 15, wherein the first vector includes:
   a first vector component representing a first distance from a first edge of the depicted first financial document to a first feature of the depicted first financial document; and
   a second vector component representing a second distance from a second edge of the depicted first financial document to a second feature of the depicted first financial document, the second edge being different from the first edge.

* * * * *